March 19, 1940.   B. B. AXSON   2,194,376
LIQUID LEVEL GAUGE
Filed April 14, 1938
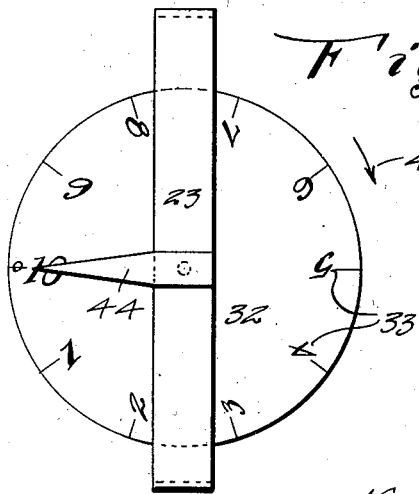
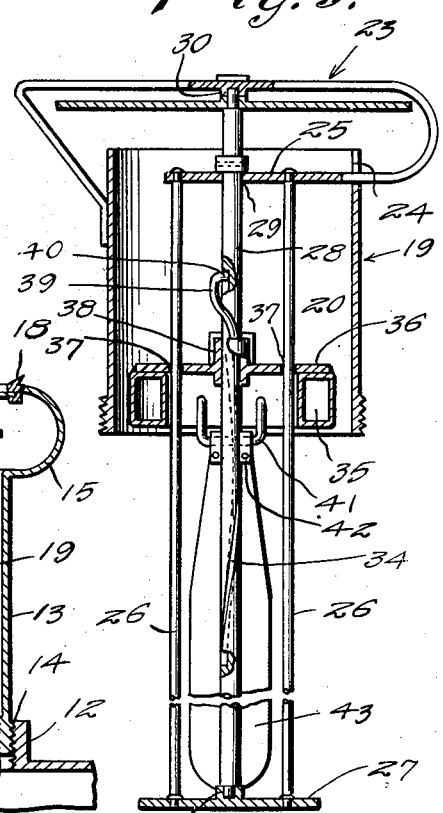
Inventor
B. B. Axson
By L. F. Rudolph
Attorney Patented Mar. 19, 1940

2,194,376

UNITED STATES PATENT OFFICE 2,194,376

LIQUID LEVEL GAUGE

Barney B. Axson, North, S. C.

Application April 14, 1938, Serial No. 202,082

2 Claims. (Cl. 73—320)

This invention relates to an improved liquid level gauge for checking the amount of gas or other liquid, in a tank.

More particularly, it is an object of this invention to provide a gauge especially adapted for underground tanks having an indicator member extending above the tank and preferably above the ground level to readily indicate the amount of liquid in such tank.

The invention is particularly adapted to gasoline tanks as employed in service stations, where the tanks are buried beneath the ground and where is it important to provide gauges from which the attendants may at all times be able to ascertain the amount of fuel in each tank.

More particularly it is an object of the invention to provide an improved gauge actuated by an improved float and enclosed by a casing having an open end removably mounted in the tank and provided with a transparent cover for viewing the indicator means and for removal of the gauge when necessary.

Other objects and advantages of the invention will hereinafter become more fully apparent from the following description of the drawing which illustrates a preferred form of the invention, and wherein:

Figure 1 is a top plan view of the gauge,

Figure 2 is a side elevational view of the gauge shown mounted in the casing, which is shown in position in an opening in a fluid tank, which is shown fragmentarily, Figure 3 is a side elevational view of the gauge as seen in position at right angles to Figure 2, and Figure 4 is a horizontal sectional view taken on the line 4—4 of Figure 2.

Referring more particularly to the drawing wherein like reference characters designate like or corresponding parts throughout the different views, 10 designates generally a portion of a tank, shown fragmentarily in Figure 2, having a conventional filling pipe 11 and an internally threaded flanged opening 12. Tank 10 is of conventional form with the possible exception of the opening 12, and is shown merely to illustrate the application of the invention which will hereinafter be described.

A cylindrical casing 13 is externally threaded on its lower end at 14 to engage the flanged opening 12, and is provided with enlarged top 15 having a transparent upper portion 16 hinged at 17 adapted to be opened by the handle portion 18.

The gauge designated generally 19, comprises a cylindrical housing 20 open at each end, and externally threaded at its lower end to engage the internally threaded lower end 22 of the casing 13. A strip of metal 23 has one end secured to the outer side of the housing 20, as seen in Figure 3, and extends upwardly and outwardly therefrom with its intermediate portion bent and disposed in spaced relationship above the upper end of housing 20. The opposite end of strip 23 is turned downwardly and inwardly and projects through a slot 24 into the upper part of the housing 20. This last mentioned end of strip 23, designated 25, supports a pair of parallel depending rods 26 having a plate 27 secured to their opposite ends.

A shaft 28 extends through the opening 29 in portion 25, and has its opposite ends journaled in bearing 30 in the under side of the intermediate portion of strip 23, and in a bearing 31 which projects upwardly from plate 27. A disk 32 is keyed to the upper part of shaft 28 beneath bearing 30, and as seen in Figure 1 is suitably calibrated as at 33. Shaft 28 is provided with a spiral groove 34, which extends from a point beneath portion 25 to a point substantially the same distance above plate 27, and which makes one complete turn around the shaft 28 for a purpose to be hereafter explained.

A hollow float body 35, preferably annular in shape as shown, has a plate 36 suitably secured to its upper part and in diametric relationship thereto. Plate 36 is provided with a pair of spaced openings 37 above the open center of float 35, through which extend the rods 26 around which the float 35 is disposed. A boss 38 is formed intermediate to the ends of plate 36, to slidably engage shaft 28, and a stud 39, preferably formed of a heavy gauge wire projects upwardly therefrom and has its free end 40 turned inwardly to engage the groove 34.

A pair of U shaped hangers 41 are secured in an opposed relationship to the inner side of float 35, and depend therefrom to receive the looped straps 42 which are secured to the upper ends of the buoyant blades 43 to pivotally connect the blades to the float 35. Blades 43 assist in maintaining float 35 on the surface of the liquid in tank 10 and also tend to prevent float 35 from being actuated by a slight surging of the liquid as they will be normally submerged and disposed across a relatively wide area of the tank.

An arrow or pointer 44 is secured to the intermediate portion of the strip 23 and extends outwardly and downwardly therefrom, with its tapered end disposed above the calibration 33. A collar 45 is adjustably mounted on shaft 28 and engages against the upper side of portion 25 to prevent the lower end of the shaft from binding in the bearing 31.

A plate 46 is suitably secured along one edge of portion 25, and depends downwardly therefrom in spaced relationship to shaft 28, to form a stop to limit the upward movement of the float 35. Plate 46 is provided with a notch or recess 47 in its lower edge to receive and accommodate the upper portion of the bushing 38. The plate 27 carried by rods 26 provides the stop for float 35 in its lower position.

From the foregoing it will be seen, that the gauge designated generally 19 can be inserted through the top 15 of casing 13 when member 16 is in its open position, and the threaded portion 21 may then be connected to the threaded portion 22 to connect housing 20 to casing 13 after which the lens 16 can be closed to seal top of casing 13, and the threaded end 14 thereof can then be mounted in the threaded flange 12. Assuming now that float 35 is in its raised position as seen in Figure 3, the weight of the float body 35 and the blades 43 will cause it to slide downwardly until the blades 43 engage the liquid in tank 10, at which time they will be swung outwardly to a horizontal position as seen in Figure 2, and the weight of body 35 will cause the float to continue to drop until it reaches a point where it is sustained by its own buoyancy in the fluid. During this movement stud 39 will be moving in groove 34 so that shaft 28 will be revolved to turn disk 32 in a counterclockwise direction, or in a direction opposite to the arrow 48. When in this position, the pointer 44 will be above the calibration 33 representing the depth of the liquid or the amount of the liquid by units of 100 or 1,000 gallons or the like as desired. As additional liquid is pumped from the tank 10 the floats 35 and 43 will move downwardly turning disk 32 still further in a counterclockwise direction, or when the tank is refilled through pipe 11 floats 35 and 43 will be raised thereby to turn disk 32 in a clockwise direction as indicated by arrow 48 to indicate the increased amount of liquid in the tank.

The procedure described for applying the gauge 19 to casing 13 and the latter to tank 10 may be reversed to remove the parts therefrom, or the gauge 19 may be removed from casing 13 leaving the latter mounted in opening 12. Blades 43 are pivotally mounted so that they may fold when the float body 35 moves upwardly into housing 20 or when the gauge 19 is being inserted into or removed from the tank 10.

Other means may be substituted for groove 34 and stud 39 to turn shaft 28 as the floats 35 and 43 rise or fall. These and various other modifications and changes may be made and are contemplated, since the drawing and description are only intended to illustrate a preferred form of the invention, and the right is therefore expressly reserved to make such variations as do not depart from the spirit and scope of the invention as hereinafter defined by the appended claims.

I claim as my invention:

1. A liquid level gauge for tanks comprising a casing having a cylindrical portion open at one end and provided with an enlarged head at the opposite end, said open end being externally and internally threaded, a sleeve having an externally threaded lower end to engage the internally threaded end of said casing to removably mount the sleeve therein, a bar mounted on the upper end of said sleeve and having one end disposed transversely within the upper part of said sleeve and its intermediate portion disposed above and in spaced relationship to said end and within said head, guide rods secured to said end of the bar and extending downwardly therefrom beyond the lower end of the casing and sleeve, a plate connecting the lower ends of said guide rods and cooperating with said end of the bar to maintain the guide rods in parallel spaced relationship to each other, a shaft journaled in the plate, and in said end and intermediate portion of the bar and disposed between said guide rods, said shaft having a spiral groove, a float slidably mounted on said guide rods and shaft and provided with a finger having an inturned end to slidably engage said groove for revolving the shaft as the float is moved relatively thereto, a calibrated disk keyed to the upper end of said shaft and disposed beneath the intermediate portion of the bar, and a pointer disposed above said disk and secured to the intermediate portion of said bar, the externally threaded end of the casing being removably mounted in the threaded opening of a tank containing a liquid with said guide rods projecting downwardly into the tank whereby said float will be actuated by the level of the liquid therein to actuate said disk relatively to the pointer.

2. A liquid level gauge comprising a cylindrical member adapted to be removably mounted in a tank opening, a strap connected to said cylindrical member and having one end disposed transversely therein, the intermediate portion of the strap being disposed above said end and above the cylindrical member, a pointer projecting outwardly from said intermediate portion, guide rods secured to and depending from said end in spaced apart relationship to each other, a plate secured to the depending ends of said rods, a shaft, provided with a spiral groove, disposed between said rods and journaled in said plate and in the said end and intermediate portion of the strap, a calibrated disk keyed to the shaft and positioned beneath the intermediate portion and pointer and adjacent thereto, and a float slidably mounted on said rods and provided with means for engaging the spiral groove for rotating the shaft as the float moves relatively thereto.

BARNEY B. AXSON.